US006493183B1

(12) United States Patent
Kasiraj et al.

(10) Patent No.: US 6,493,183 B1
(45) Date of Patent: Dec. 10, 2002

(54) THERMALLY-ASSISTED MAGNETIC RECORDING SYSTEM WITH HEAD HAVING RESISTIVE HEATER IN WRITE GAP

(75) Inventors: Prakash Kasiraj, San Jose, CA (US); Neil Leslie Robertson, Palo Alto, CA (US); Hemantha Kumar Wickramasinghe, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 09/608,848

(22) Filed: Jun. 29, 2000

(51) Int. Cl.$^7$ .............................................. G11B 5/147
(52) U.S. Cl. ...................................... 360/126; 360/119
(58) Field of Search ........................... 360/57, 126, 59, 360/85, 119, 120, 121, 129, 137, 125, 313

(56) References Cited

U.S. PATENT DOCUMENTS

| | | | | |
|---|---|---|---|---|
| 4,191,983 A | * | 3/1980 | Gibson | 360/125 |
| 4,520,409 A | | 5/1985 | Kimoto et al. | 360/59 |
| 4,740,797 A | * | 4/1988 | Yamamoto et al. | 346/74.4 |
| 5,025,341 A | * | 6/1991 | Bousquet et al. | 360/120 |
| 5,173,826 A | * | 12/1992 | Bischoff | 360/126 |
| 5,247,571 A | | 9/1993 | Kay et al. | 379/207 |
| 5,278,716 A | * | 1/1994 | Okuda et al. | 360/126 |
| 5,404,396 A | | 4/1995 | Brennan | 379/201 |
| 5,448,631 A | | 9/1995 | Cain | 379/201 |
| 5,583,727 A | | 12/1996 | Parkin | 360/110 |
| 5,699,605 A | * | 12/1997 | Amin et al. | 29/603.14 |
| 5,828,533 A | * | 10/1998 | Ohashi et al. | 360/126 |
| 5,832,063 A | | 11/1998 | Vysotsky et al. | 379/88 |
| 5,844,896 A | | 12/1998 | Marks et al. | 370/385 |
| 5,870,260 A | * | 2/1999 | Davies et al. | 369/115 |
| 5,958,016 A | | 9/1999 | Chang et al. | 709/229 |
| 5,986,978 A | | 11/1999 | Rottmayer et al. | 369/13 |
| 6,074,566 A | * | 6/2000 | Hsiao et al. | |
| 6,181,514 B1 | * | 1/2001 | Santini et al. | 360/126 |
| 6,188,544 B1 | * | 2/2001 | Mino | 360/126 |
| 6,204,999 B1 | * | 3/2001 | Crue et al. | 360/126 |
| 6,266,868 B1 | * | 7/2001 | Sasaki | 29/603.1 |
| 6,325,947 B1 | * | 12/2001 | Garfunkel et al. | |
| 6,329,087 B1 | * | 12/2001 | Okamoto | 428/692 |
| 6,330,128 B1 | * | 12/2001 | Chang et al. | 360/126 |
| 6,369,983 B1 | * | 4/2002 | Hong | 360/123 |
| 6,396,670 B1 | * | 5/2002 | Murdock | 360/319 |

OTHER PUBLICATIONS

Bellcore, GR–1298–CORE, AINGR: Switching Systems, Issue 4, Revision 1, Oct. 1998, pp. 2–4, 3–28, 3–29, 3–30, 3–44, 3–45, 3–46, 3–47, 3–48.
H. J. Rosen and D. A. Thompson, "Thermally–Assisted Magnetic Recording,"—IBM Disclosure Bulletin, vol. 40, No. 10, p. 65, Oct. 1997. (AM8–97–0112).

* cited by examiner

Primary Examiner—Brian E. Miller
Assistant Examiner—Dzung C Nguyen
(74) Attorney, Agent, or Firm—Thomas R. Berthold

(57) ABSTRACT

A thermally-assisted magnetic recording disk drive records data by heating a small region of the magnetic layer on the disk to near or above its Curie temperature while a write field is applied by a thin film inductive write head. The thin film inductive write head includes an electrically resistive heater located in the write gap between the pole tips of the write head. The resistive heater is sandwiched between first and second spacer layers that are located between the pole tips of the write head. In a current-perpendicular-to-the plane (CPP) embodiment, the spacer layers are electrically conductive and the pole tips serve as the electrical leads to provide electrical current in a direction generally perpendicular to the layer of resistive heater material. In a current-in-the plane (CIP) embodiment, the spacer layers are formed of insulating material and electrical leads are formed as portions of a film between the spacer layers and in contact with each side of the resistive heater. The width of the resistive heater is less than the width of the pole tips. Thus since only the region of the magnetic layer on the disk that is heated by the resistive heater can be written by the pole tips of the write head, the data track width on the disk is defined by the width of the resistive heater, not by the geometry of write head pole tips.

12 Claims, 6 Drawing Sheets

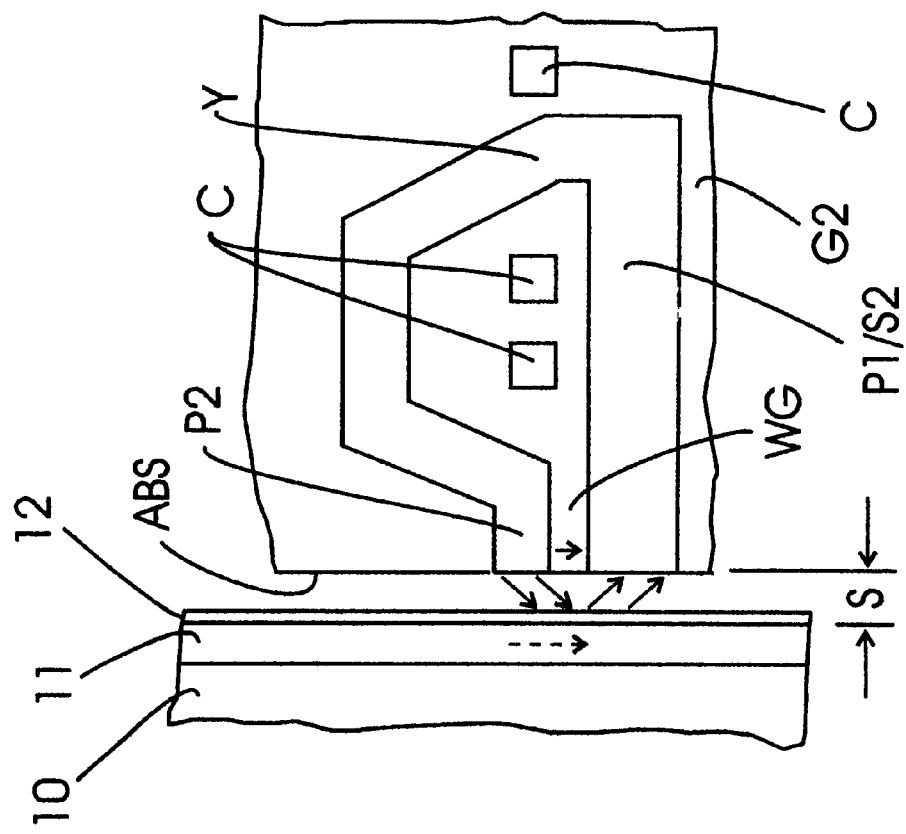
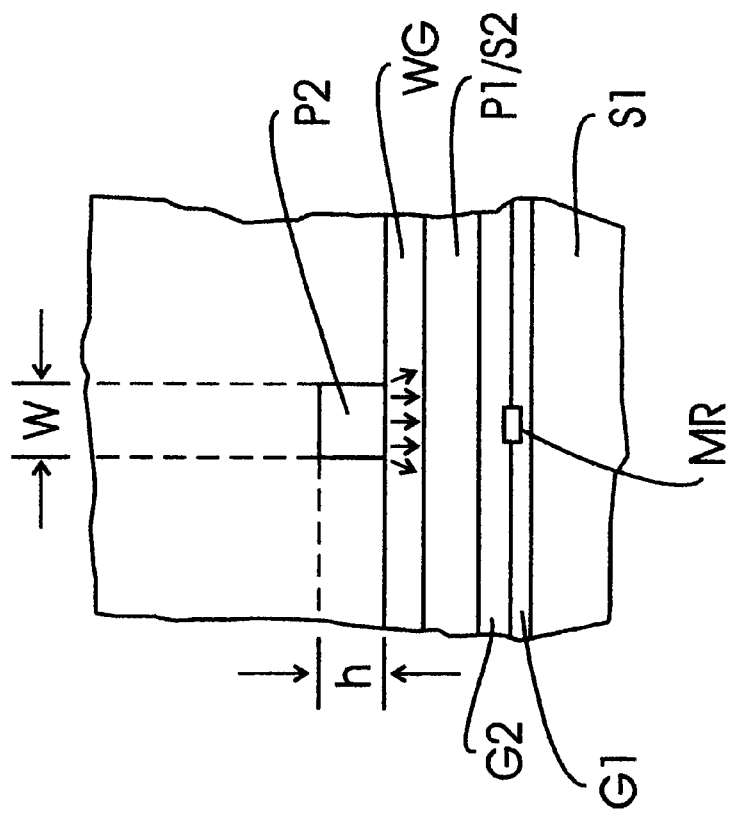
FIG. 1B (PRIOR ART)
FIG. 1A (PRIOR ART)

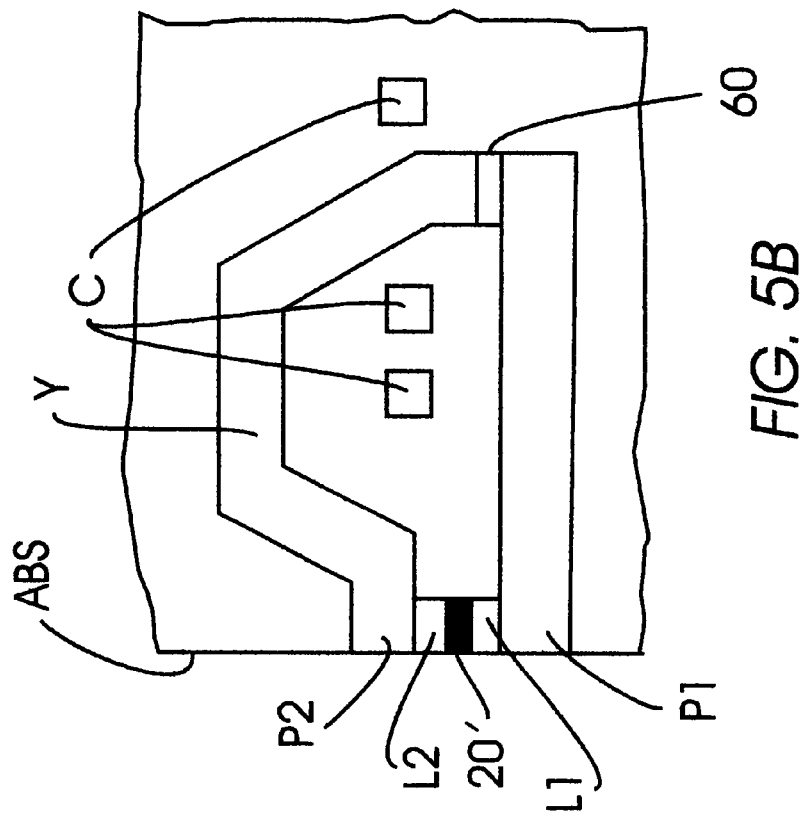
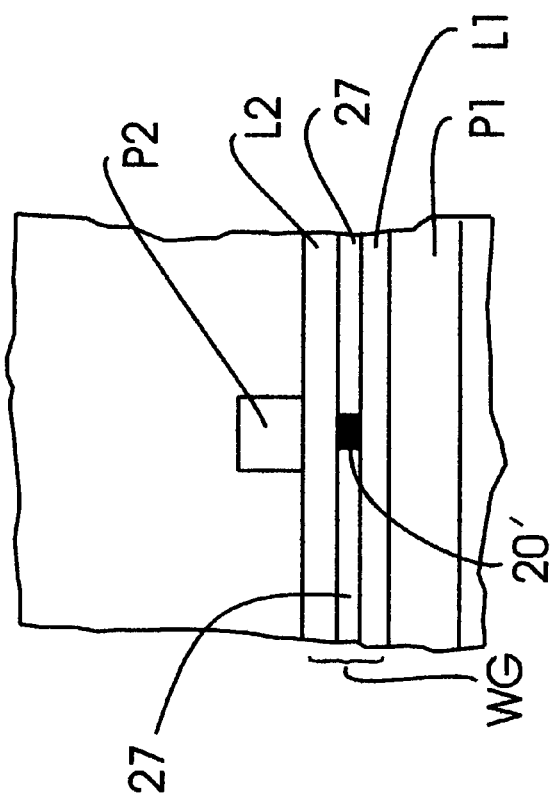
FIG. 5B
FIG. 5A

THERMALLY-ASSISTED MAGNETIC RECORDING SYSTEM WITH HEAD HAVING RESISTIVE HEATER IN WRITE GAP

TECHNICAL FIELD

This invention relates to digital magnetic recording, and more particularly to a magnetic recording disk drive where data is written while the magnetic recording layer is at an elevated temperature.

BACKGROUND OF THE INVENTION

Magnetic recording disk drives store digital information by using a miniaturized thin film inductive write head. The write head is patterned on the trailing surface of a slider that also has an air-bearing surface (ABS) to allow the slider to ride on a thin film of air above the surface of the rotating disk. The write head is an inductive head with a thin film electrical coil located between the poles of a magnetic yoke. When write current is applied to the coil, the pole tips provide a localized magnetic field across a gap that magnetizes the recording layer on the disk into one of two distinct magnetic states (binary data bits).

The magnetic material for use as the recording layer on the disk is chosen to have sufficient coercivity such that the magnetized data bits are written precisely and retain their magnetization state until written over by new data bits. The data bits are written in a sequence of magnetization states to store binary information in the drive and the recorded information is read back with a use of a read head that senses the stray magnetic fields generated from the recorded data bits. Magnetoresistive (MR) read heads include those based on anisotropic magnetoresistance (AMR), giant magnetoresistance (GMR), such as the spin-valve type of GMR head, and the more recently described magnetic tunnel junction (MTJ) effect. Both the write and read heads are kept in close proximity to the disk surface by the slider's ABS, which is designed so that the slider "flies" over the disk surface as the disk rotates beneath the slider. As the recording bit size decreases to increase the data density on the disk, several problems arise with the conventional thin film inductive write head and writing process.

The first problem relates to the "superparamagnetic" effect. The areal data density (the number of bits that can be recorded on a unit surface area of the disk) of magnetic disk drives is now approaching the point where the data bits are so small they can be demagnetized simply from thermal agitation within the magnetized bit (the so called the "superparamagnetic" effect). The conventional approach to circumventing this problem is to increase the magnetic anisotropy and coercivity of the magnetic material in the recording layer on the disk to improve the thermal stability. However, this requires that the write head be made with a material with high saturation moment to increase the write field of the head so the head can write on the high coercivity media. Based on the properties of known materials, the ultimate write field of the head can only be increased by about 30%, thus severely limiting future data density growth. In addition, the increased data rate required at higher areal density requires that the magnetic properties of the materials used in the write head have to be optimized, which is very difficult to achieve if the materials suitable for use are limited to only those that have a very high saturation moment.

The second problem relates to the need for narrow track widths to increase the areal data density. As the track width gets narrower, the portion of the track width that is defined by the track edge stray or fringe fields from the write head becomes a larger portion of the track width since the spacing between the head and disk cannot be scaled due to engineering difficulties with head and disk tribology. This degrades the data quality since more and more of the written track width consists of the poorly written edge regions. In addition, to reduce the track width while still providing an adequate write field requires that one of the pole tips of the write head has a geometry in which the height of the pole is much greater than its width. A write head with such a high aspect ratio pole tip geometry is difficult to fabricate.

Since it is known that the coercivity of the magnetic media (i.e., the magnetic recording layer on the disk) is temperature dependent, one proposed solution is "thermally assisted" magnetic recording (TAMR), wherein the magnetic material in the media is heated locally to near or above its Curie temperature during writing so that the coercivity is low enough for writing to occur, but high enough for thermal stability of the recorded bits at ambient temperature. Several approaches to TAMR have been proposed, including use of a laser beam or ultraviolet lamp to do the localized heating, as described in IBM Technical Disclosure Bulletin, Vol. 40, No. 10, October 1997, pp. 65–66, and IBM's U.S. Pat. No. 5,583,727. In these approaches, the heating area is typically wider than the data bit so that the data bit dimension is still determined by the size of the write head. Thus while the first problem described above is addressed by these TAMR approaches, the second problem is not addressed because the write head geometry and fringe fields still limit the reduction in track width that can be achieved.

A read/write head for use in a magneto-optic (MO) or TAMR system is described in U.S. Pat. No. 5,986,978, wherein a special optical channel is fabricated adjacent to the pole or within the gap of a write head for thermally assisted writing of the MO or magnetic media by directing laser light or heat down the channel. An older technology unrelated to TAMR is also known for use in a copy machine which magnetizes a film with an image that is then transferred to a paper using magnetic ink. In that technology, as described in U.S. Pat. No. 4,520,409, a ring type head uses a resistive heater in the gap between the poles to modulate heat pulses to the film while the pole piece applies a constant bias field to the film.

What is needed is a write head for a TAMR system that allows for narrow track widths to be achieved without the constraint that the track width is determined by the geometry of the write head pole tips or the fringe fields from the write head.

SUMMARY OF THE INVENTION

The invention is a thermally-assisted magnetic recording disk drive wherein the thin film inductive write head includes an electrically resistive heater located in the write gap between the pole tips of the write head. The resistive heater is sandwiched between first and second spacer layers that are located between the pole tips of the write head. In one embodiment, referred to as current-perpendicular-to-the plane (CPP), the spacer layers are electrically conductive and the pole tips serve as the electrical leads to provide electrical current in a direction generally perpendicular to the layer of resistive heater material. In a second embodiment, referred to as current-in-the plane (CIP), the spacer layers are formed of insulating material and electrical leads are formed as portions of a film between the spacer layers and in contact with each side of the resistive heater.

The width of the resistive heater is less than the width of the pole tips. Thus since only the region of the magnetic layer on the disk that is heated by the resistive heater can be written by the pole tips of the write head, the data track width on the disk is defined by the width of the resistive heater, not by the geometry of write head pole tips.

For a fuller understanding of the nature and advantages of the present invention, reference should be made to the following detailed description taken together with the accompanying figures.

BRIEF DESCRIPTION OF THE DRAWING

FIGS. 1A–1B are sectional views of a portion of a prior art merged magnetoresistive (MR) read head and inductive write head, with the head shown adjacent a portion of a rotatable magnetic recording disk in FIG. 1B.

FIGS. 5A–5B are sectional views of a TAMR write head of the present invention wherein the current through the resistive heater in the write gap is perpendicular-to-the-plane (CPP).

DETAILED DESCRIPTION OF THE INVENTION

Prior Art

Figure 2B:
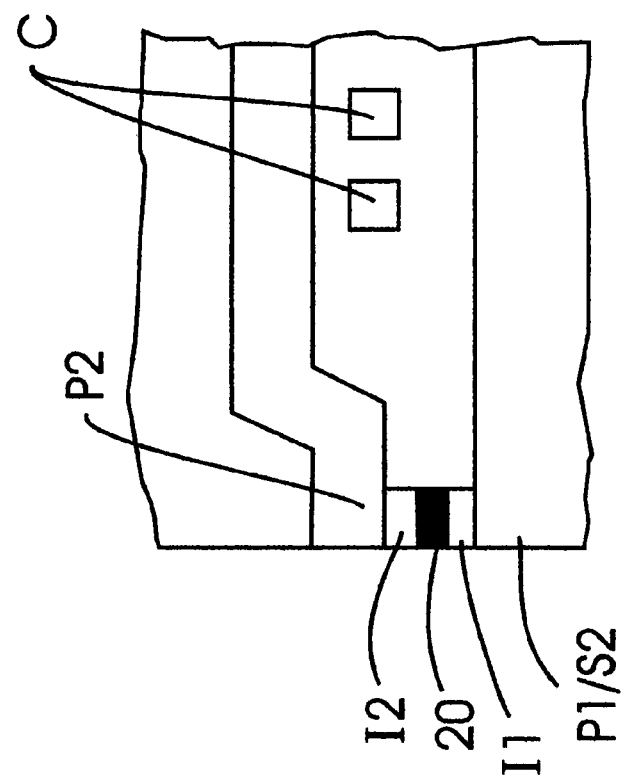
FIGS. 2A–2B are sectional views of a TAMR write head of the present invention wherein the current through the resistive heater in the write gap is in-the-plane (CIP).

FIGS. 1A–1B illustrate a portion of a prior art merged magnetoresistive (MR) read head and inductive write head showing the read element MR and the inductive write head comprising yoke Y and coil C (the segments of coil C are shown in sectional view in FIG. 1B). The merged head is mounted on the trailing end of a head carrier, such as an air-bearing slider. As shown in FIG. 1A, the read head includes the magnetoresistive element MR which is sandwiched between first and second gap layers G1 and G2, the gap layers in turn being sandwiched between first and second shield layers S1 and S2. In a merged head, the second shield layer S2 of the read head also serves as the bottom pole piece P1 for the write head (P1/S2). The magnetic field from the write head is produced in the write gap WG between two magnetic poles P1 and P2, as shown in FIG. 1A where the write head pole tips are viewed from the slider's air-bearing surface (ABS) directly above the disk. FIG. 1B also shows a section of a disk 10 facing the ABS and having a magnetic recording layer located beneath a protective overcoat 12. The magnetic field generated by the write head has to overcome the coercivity of the magnetic layer 11 in order to write the data bit. The field limit of the write head is determined by the saturation moment of the materials used to fabricate the pole pieces. The width of the written bit is defined by the physical dimension of the write head pole tip P2 (its width w and height h) and by the amount of stray fringing field produced at the edges of the write head pole tips, as shown by the arrows in FIG. 1A, and depends on the gap WG between the poles and the spacing S (FIG. 1B) between the ends of the pole tips and the magnetic layer 11 on the disk.

Preferred Embodiments

In the TAMR system of the present invention a resistive heater is built into the gap of the poles of a thin film magnetic recording write head. The close proximity of the heater to the disk allows the magnetic layer to be heated near or above its Curie temperature while the data bit is recorded as the magnetic layer cools while exposed to a magnetic field from the write head. As the disk rotates beneath the head, the magnetic layer cools and retains the sign of the magnetic field. There are two possible recording schemes for this approach: 1) the heater is kept on during the entire write process and the cooling of the magnetic layer as the media moves away from the heater determines the location of the data bit, with polarity of the data bit determined by the write head field at the time of the cooling, and 2) the heater is turned on and off to record islands of data bits with the polarity of the magnetic state determined by the polarity of the magnetic field produced by the write head.

Because the edge of the written track is determined by the spreading of the heat in the resistive heater and in the magnetic layer the track width is determined by the width of the resistive heater. Thus, since the width w of P2 no longer controls the track width, the problem of fabricating a high aspect ratio (h/w) pole tip P2 is substantially alleviated. Also, since the magnetic fields required from the write head are relatively small (e.g., less than 500 Oe), the magnetic material for the write head can be selected based on data rate performance rather than solely on saturation moment. The orientation of the recorded magnetization can be either in the plane (conventional longitudinal recording) or out of the plane (perpendicular recording), depending on the type of magnetic layer used and the location of the resistive heater within the write pole gap.

Figure 2A:
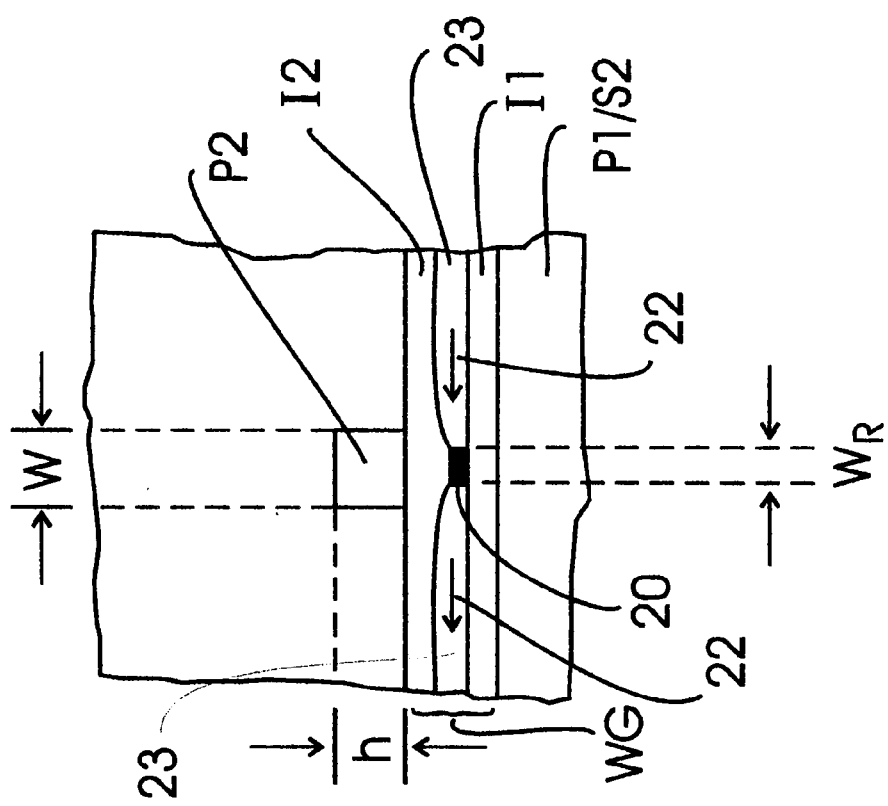

Referring now to FIGS. 2A and 2B, an embodiment of the TAMR head for longitudinal recording is depicted. The resistive heater 20 is located to be spaced symmetrically in the center of the write poles P2, P1 so that the poles produce maximum longitudinal field in the magnetic layer with zero or very small perpendicular component. For perpendicular recording, the heater would be placed asymmetrically nearer to one of the poles so that substantial amounts of both perpendicular and longitudinal fields will be present in the magnetic layer with the magnetic layer's perpendicular anisotropy causing the data to be written in the perpendicular orientation. The written data is read back using conventional read head technology, such as a MR read head.

In FIGS. 2A–2B, the resistor or resistive heater 20 is built with a current-in-the-plane (CIP) geometry, as shown by arrows 22 depicting the direction of electrical current through resistive heater 20 located in conductive film 23. Since the magnetic fields required are not large, the write poles P1, P2 can be separated farther than in conventional recording. Also, a larger variety of magnetic materials may used to fabricate the poles, such as 80/20 permalloy (NiFe). Since the track width is defined primarily by the width ($W_R$) of resistive heater 20, the magnetic poles P2, P1 can have a width w wider than the width $W_R$ of resistive heater 20 and thus wide enough so that low areal density write head fabrication technology can be used. In the CIP geometry, the write gap WG material between the write poles comprises a patterned conductive film 23 containing resistive heater 20 sandwiched between two spacer films I1 and I2, which in the CIP geometry are dielectric films formed of any electrically insulating and good thermal conducting material, such as alumina ($Al_2O_3$), aluminum nitride, and diamond-like carbon. Film 23 is an electrical conductor that includes a central region where the resistive heater 20 is located and is made of a good electrical and thermal conductor, such as rhodium or gold. Resistive heater 20 is made of a material with a higher electrical resistance than the non-central regions of film 23 (the regions on either side of heater 20 that serve as the electrical leads to heater 20). Heater 20 may be formed of a low thermal conductivity electrically conductive material, such as graphite-like carbon, tantalum (Ta), titanium (Ti) or NiCr. The linear resolution of the thermal write head is determined by the sharpness of the temperature drop between the resistive heater 20 and the surrounding electrically insulating films I1, I2. Thus the thermal conductivity of I1 and I2 needs to be as high as possible while retaining the electrical insulating property.

Figure 3:
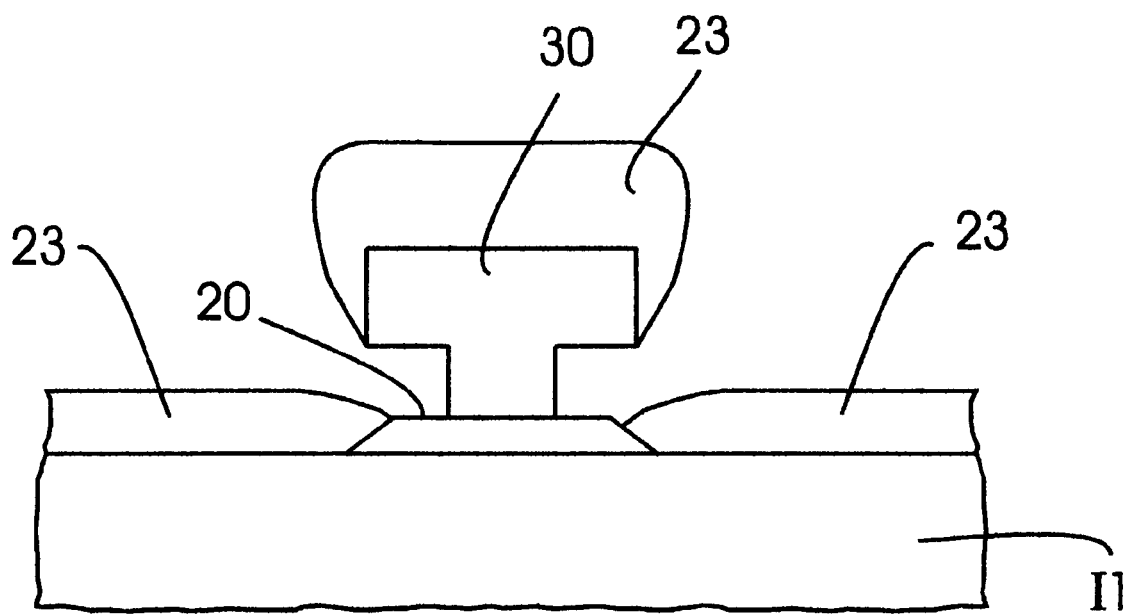
FIG. 3 is a sectional view illustrating the lithographic process for forming the resistive heater in the write gap.

The CIP resistor 20 is fabricated by a process similar to that used to fabricate conventional magnetoresistive read heads. Referring to FIG. 3, first the resistive heater 20 is formed by depositing a full film of resistive heater material over the I1 layer that electrically isolates the heater from the magnetic write pole P1. Next a conventional bilayer photoresist 30 is deposited and patterned over the heater material 20 to form a long narrow stripe whose width defines the heater track width. This is followed by a subtractive removal of the non-central regions of the resistive film material on either side of the heater 20 using the photoresist 30 as a mask. This removal can be done using conventional ion milling. Next a film of conductive lead material 23 is deposited over the photoresist 30. This allows the film 23 to overlap the edges of heater 20 and provide electric current to operate the heater. After removal of the bilayer photoresist 30, an additional bilayer photoresist process is performed to define the front and back regions of the preferably square-shaped heater 20. However, unlike the process for the definition of the track width when conducting films are redeposited after side removal of the resistive material, an insulating film is deposited after ion milling the front and back regions to electrically isolate the input and output leads for the heater. After removal of the second bilayer photoresist, an insulating layer 12 is then deposited over heater 20 and film 23 to electrically isolate the heater from the magnetic pole P2 of the write head. FIG. 3 also shows an advantage of the present TAMR write head over conventional write heads. Since the track width defining process (the formation of resistive heater 20) can be made with a low aspect ratio (e.g., less than 4:1), the write track width can be extended much farther than in conventional magnetic recording in which write heads with aspect ratios (h/w of P2 in FIG. 1A) of greater than 10:1 are needed for high areal density.

Figure 4:
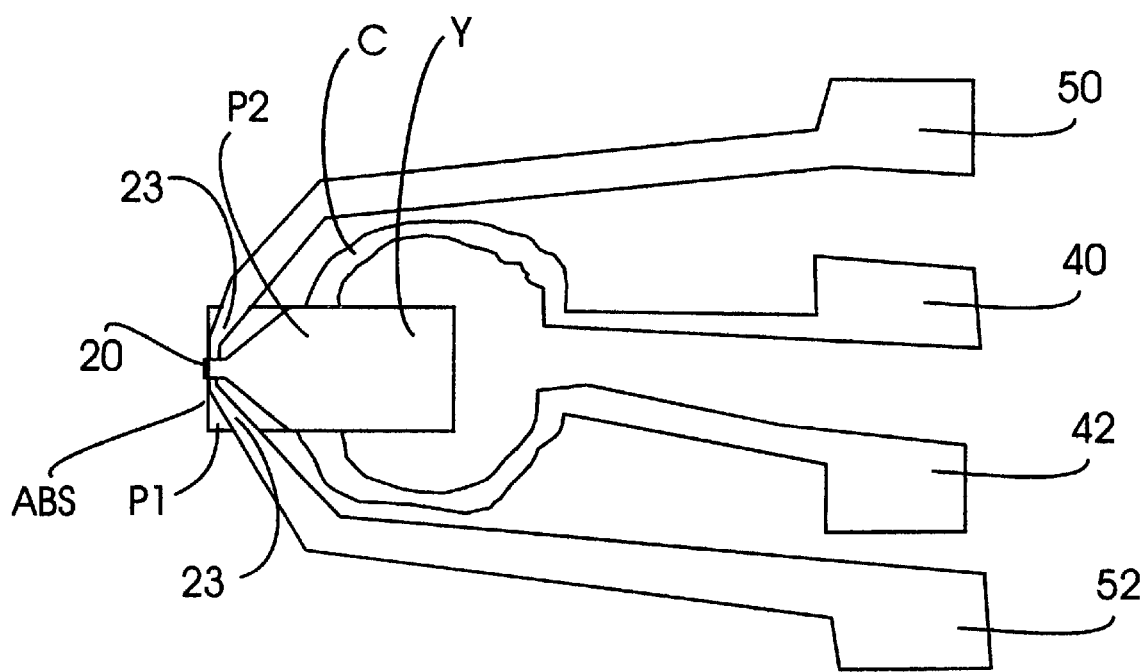
FIG. 4 is a plan view of the TAMR head shown in FIGS. 2A–2B illustrating the layout of the electrical leads to the write coil and the CIP resistive heater.

The electrical lead layout for a CIP TAMR write head is shown in the top plan view of FIG. 4. Four leads are needed, two leads 40, 42 for the write coil C that passes through yoke Y, and two leads 50, 52 for the CIP resistive heater 20 in film 23. However, one of the four leads may be eliminated by using a common ground for both the write coil C and the resistive heater 20.

In FIGS. 5A–5B, an embodiment of the TAMR write head is shown wherein the electrical current to the resistive heater 20' is perpendicular-to-the-plane (CPP) of the resistive film. The write poles P2, P1 carry the electrical current to the resistive heater 20'. To use the two magnetic films P2 and P1 as electrical leads, they are electrically separated in the back of the write head yoke Y by a thin dielectric film 60, as shown in FIG. 5B. This separation will only degrade the magnetic efficiency of the write head by a very insignificant amount since the overlapping area in the back gap can be made to be much larger than the overlap area in the front pole tip region. The electrical shunt capacitance caused by the back gap is negligible. In the CPP geometry, the material for the write gap WG between the write poles P2 and P1 comprises a patterned resistive film 27 sandwiched between the two spacer films L1 and L2 that serve as the electrically conductive leads for electrical current from the poles P2 and P1. The lead films L1 and L2 may be made of rhodium or gold. The film making up heater 20' is made of a very good insulator, such as diamond-like carbon or aluminum nitride (AlN) so that current from P2 to P1 is directed through the resistive heater 20' portion of film 27. The resistive heater 20' is fabricated by a process like that used to fabricate the CIP resistor (see FIG. 3). In the CPP geometry the area of the electrical connection between the leads P2, P1 and the resistive heater 20' is larger than in the CIP geometry because in the CIP geometry the resistive heater 20 is contacted at its edges by the non-central regions of film 23 (see FIG. 2A). Thus the contact resistance and reliability of the junction is better in the CPP geometry. Another advantage of the CPP embodiment is that the lead materials with both good electrical conduction properties and good thermal conduction properties are readily available so that good thermal gradients can be created in the resistive heater 20'.

Figure 6:
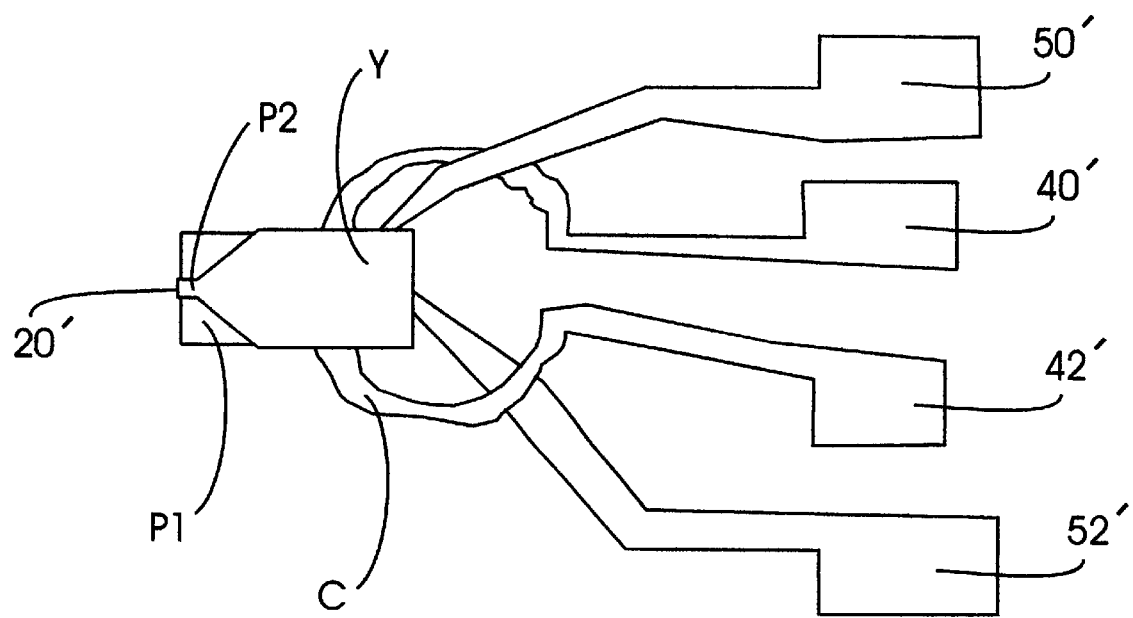
FIG. 6 is a plan view of the TAMR head shown in FIGS. 5A–5B illustrating the layout of the electrical leads to the write coil and the CPP resistive heater.

The electrical lead layout for a TAMR write head using the CPP geometry is shown in FIG. 6. Lead 50' goes to pole tip P2 and lead 52 goes to pole tip P1.

Typical dimensions, resistances and predicted areal data densities for the structures of the CIP and CPP TAMR write heads are given below in Table 1.

TABLE 1

| Resistor track width (nm) | Resistor stripe height (nm) | Resistor thickness (nm) | Write gap (nm) | CPP resistor (ohms) | CPP junctn area (nm²) | CIP resistor (ohms) | CIP junctn area (nm²) | Density (Gb/in²) |
|---|---|---|---|---|---|---|---|---|
| 200 | 200 | 100 | 300 | 1.25 | 40000 | 5.0 | 20000 | 32 |
| 100 | 100 | 50 | 300 | 2.50 | 10000 | 10.0 | 5000 | 129 |
| 50 | 50 | 25 | 300 | 5.0 | 2500 | 20.0 | 1250 | 516 |
| 10 | 10 | 5 | 300 | 25 | 100 | 100 | 50 | 12900 |

Both the CIP and CPP resistive heaters can be fabricated using thin film wafer processes that are similar and compatible with existing recording head process technology and is thus very inexpensive to implement. Modeling shows that with appropriate thermal engineering of the magnetic layer on the disk and with the head only 5–10 nm from the disk, good thermal power transfer efficiency can be expected. The 30 microwatts of power needed to heat a 10 nm×10 nm area of the disk surface to 200° C. can be achieved by near-field thermal coupling from a resistive heater heated to 500–600° C. The thermal response times of both the CIP and CPP TAMR write heads are less than 100 picoseconds (ps).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thin film write head for thermally assisted magnetic recording comprising:
   a substrate;
   a magnetic yoke on the substrate, the yoke comprising first and second pole pieces, each said pole piece having a pole tip, the pole tips being spaced-apart to define a write gap;
   a first spacer layer located in the write gap adjacent the first pole tip;
   a second spacer layer located in the write gap adjacent the second pole tip;
   a resistive heater layer of electrically conducting material located between the first and second spacer layers in the write gap for generating heat when electrical current is applied to said resistive heater layer;
   first and second electrical leads connected to the resistive heater layer for providing electrical current to heat said resistive heater layer, the resistive heater layer having a higher electrical resistance than said leads; and
   a coil layer located within the yoke for generating a magnetic field across the pole tips.

2. The head according to claim 1 wherein the substrate is the trailing face of an air-bearing slider.

3. The head according to claim 1 wherein the width of the resistive heater layer is smaller that the width of the second pole tip measured along a line parallel to both the pole tip surface and the substrate surface.

4. The head according to claim 1 wherein the first and second spacer layers are formed of electrically conducting material and wherein the first and second pole pieces comprise the first and second leads, whereby electrical current directed through one of the pole pieces is conducted through one of the spacer layers generally perpendicular to the plane of the resistive heater layer located between the first and second spacer layers.

5. The head according to claim 1 wherein the first and second spacer layers are formed of electrically insulating material and wherein the first and second leads are formed in the write gap between the first and second spacer layers, each lead being located on a respective side of the resistive heater layer, whereby electrical current directed through one of the leads is conducted generally in the plane of the resistive heater layer.

6. The head according to claim 1 further comprising a magnetoresistive read element on the substrate.

7. The head according to claim 6 wherein the magnetoresistive read element is located between the substrate and the magnetic yoke of the write head and further comprising a first shield layer located between the substrate and the read element.

8. A magnetic recording disk drive comprising:
   a rotatable magnetic recording disk comprising a substrate and a magnetic recording layer on the substrate;
   a slider having a disk-facing surface and a trailing face and being maintained in proximity to the disk; and
   a thermally assisted magnetic write head formed on the trailing face of the slider and comprising
      a magnetic yoke having first and second pole pieces, each said pole piece having a pole tip facing the disk, the pole tips being spaced-apart so as to define a write gap;
      a first spacer layer located in the gap adjacent the first pole tip;
      a second spacer layer located in the gap adjacent the second pole tip;
      a resistive heater layer of electrically conducting material located between the first and second spacer layers in the write gap for heating the magnetic recording layer on the disk when electrical current is applied to said resistive heater; and
      a coil layer located within the yoke for generating a magnetic field across the pole tips to the heated magnetic recording layer on the disk when write current is applied to the coil.

9. The disk drive according to claim 8 wherein the spacer layers are electrically conductive and wherein the pole pieces comprise the electrical leads for providing current generally perpendicular to the resistive heater layer through the spacer layers.

10. The disk drive according to claim 8 wherein the width of the resistive heater layer is smaller that the width of the second pole tip measured along a line parallel to both the pole tip surface and the trailing face of the slider.

11. The disk drive according to claim 8 further comprising electrical leads for providing current to the resistive heater layer.

12. The disk drive according to claim 11 wherein the electrical leads are located in the write gap between the first and second spacer layers, whereby electrical current passes generally in the plane of the resistive heater layer.

* * * * *